Patented Mar. 17, 1931

1,797,196

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

TRI-NAPHTHYLAMINE

No Drawing. Original application filed March 14, 1929, Serial No. 347,183. Divided and this application filed December 23, 1929. Serial No. 416,221.

This invention relates to a new class of chemical compounds, and it has particular relation to the provision of a new class of compounds peculiarly adapted to be used as antioxidants or age retarders in rubber compounds.

This application is a division of application Serial No. 347,183, filed March 14, 1929.

One object of the invention is to provide an antioxidant which is simple to manufacture, the use of which results in a product having exceptionally high resistance to the deleterious effects of oxygen, sunlight and other weather agencies.

Another object of the invention is to provide a class of efficient antioxidants or age retarders which are substantially free from disagreeable odors and toxic effects upon the workmen employed in handling them.

Heretofore, it has been observed that certain compounds such as hydroquinone and reaction products of aldehydes (such as furfuraldehyde) and aromatic amines (alpha naphthylamine), when incorporated into rubber, materially retard the aging effects produced by atmospheric oxygen and sunlight. Another class of compounds which have also been found useful for this purpose is that of the aromatic amines, such as beta-naphthylamine. Some of these compounds are objectionable because it is difficult to reduce them to a sufficiently fine degree of sub-division to permit of their uniform distribution through the rubber compound. Also, some of them are objectionable because of disagreeable odors which they possess and because they discolor the rubber.

This invention consists in the discovery of a new class of tertiary aromatic amines, particularly the tri-naphthylamines and their use as antioxidants for rubber compounds. These substances are quite efficient in their age retarding effects and may be incorporated into rubber compounds with the greatest of ease. In addition, they are also substantially non-odorous. Tri-naphthylamines are found in certain proportions (approximately 10%) in the unpurified dinaphthylamines manufactured from naphthol and anhydrous ammonia by the application of heat and pressure in an autoclave in accordance with the disclosure of my co-pending application Serial No. 274,683, filed May 2, 1928.

The tertiary amine may be extracted from the dinaphthyl compound by extraction with benzol in which it is readily soluble and from which it crystallizes upon standing. The material is obtained in the form of fine white crystals having a definite melting point of from 233° to 235° C. Solutions of the compound show a dark blue fluorescence when they are held up to the light. The crystalline material itself fluoresces a brilliant light blue when exposed to ultra violet light. It is quite soluble in aromatic hydrocarbons but is comparatively insoluble in ethyl alcohol. The materials may be used as antioxidants in most of the standard rubber compounds. The following is an example of a formula in which their use assures excellent results:

| | Parts |
|---|---|
| Extracted rubber | 100 |
| Zinc oxide | 5 |
| Sulfur | 3 |
| Stearic acid | 1.5 |
| Hexamethylene tetramine | 1 |
| Antioxidant | 1 |

Samples of rubber compound, prepared in accordance with the preceding formula in which tri-beta-naphthylamine was employed as an antioxidant, were subjected to vulcanization for various periods of time. These samples were then subjected to tests to ascertain their elongation and tensile strength before they were subjected to the action of oxygen.

A second set of samples vulcanized under exactly the same conditions were first weighed and were then placed in an oxygen bomb and subjected to artificial aging for a period of six days at a temperature of 50° C. and at a pressure of 150 lbs. per sq. in. The samples were then weighed a second time to ascertain the percentage of oxygen absorbed after which they were subjected to physical tests to ascertain their elasticity and tensile strength after artificial aging.

The results of these tests are contained in the following table:

| Cure | | Stress in kgs./cm.² at— | | | Percent elong. at break | Percent weight increase |
|---|---|---|---|---|---|---|
| Time in mins. | Pressure lbs. per sq. in. | 500% elong. | 700% elong. | Break | | |
| 35 | 40 | 12 | 48 | 109 | 880 | |
| 50 | 40 | 16 | 56 | 135 | 850 | |
| 70 | 40 | 26 | 98 | 170 | 800 | |
| AFTER AGING | | | | | | |
| 35 | 40 | 13 | 41 | 105 | 870 | .21 |
| 50 | 40 | 19 | 65 | 135 | 830 | .52 |
| 70 | 40 | 27 | 104 | 152 | 765 | .68 |

From these tables it will be apparent that the percent of oxygen absorbed by samples was comparatively small even under the relatively severe conditions existing in an oxygen bomb. Also, the artificially aged samples retained to an exceptional degree their original tensile strength and elasticity. Under similar conditions, samples containing no antioxidant were reduced to resinous masses substantially devoid of elasticity or tensile strength.

These compounds may also be employed as antioxidants in soaps, transformer oils and similar organic compounds which are subject to deterioration due to oxidation.

Although I have described in detail only the preferred embodiments of the invention, it will be apparent to those skilled in the art that it is not so limited but that various modifications may be made therein without departing from the spirit of the invention or from the scope of the appended claims.

What I claim is:

1. As a new chemical compound, tri-naphthylamine.

2. As a new chemical compound, tri-beta-naphthylamine.

In witness whereof, I have hereunto signed my name.

Signed at Akron, in the county of Summit and State of Ohio, U. S. A., this 21st day of December, 1929.

ALBERT M. CLIFFORD.